United States Patent [19]

Heilweil

[11] Patent Number: 4,490,261
[45] Date of Patent: Dec. 25, 1984

[54] ACIDIC HIGH TEMPERATURE STABLE AQUEOUS BRINE FLUIDS VISCOSIFIED BY BASIC N-HETEROCYCLIC POLYMERS

[75] Inventor: Israel J. Heilweil, Princeton, N.J.

[73] Assignee: Mobil Oil Corporation, New York, N.Y.

[21] Appl. No.: 454,204

[22] Filed: Dec. 28, 1982

[51] Int. Cl.³ .......................... C09K 7/00; E21B 43/00
[52] U.S. Cl. ............................ 252/8.5 A; 252/8.55 R; 524/548
[58] Field of Search ............ 252/8.5 A, 8.5 C, 8.55 R; 524/548

[56] References Cited

U.S. PATENT DOCUMENTS

| | | | |
|---|---|---|---|
| 4,045,357 | 8/1977 | Reed | 252/8.5 |
| 4,046,197 | 9/1977 | Gruesbeck et al. | 252/8.5 X |
| 4,079,011 | 3/1978 | Tate | 252/8.55 |
| 4,304,677 | 12/1981 | Stauffer et al. | 252/8.55 |
| 4,396,734 | 8/1983 | Williams et al. | 524/548 X |

*Primary Examiner*—Herbert B. Guynn
*Attorney, Agent, or Firm*—Alexander J. McKillop; Michael G. Gilman; Charles J. Speciale

[57] ABSTRACT

There is provided an aqueous brine fluid having a pH of less than about 5 and containing a high salt concentration and a basic N-heterocyclic polymer or copolymer such as polyvinyl pyridine which serves to increase the viscosity of the fluid, particularly at elevated temperatures of above about 300° F. These fluids are particularly useful as drilling fluids for the drilling of oil and gas wells.

19 Claims, 2 Drawing Figures

ACIDIC HIGH TEMPERATURE STABLE AQUEOUS BRINE FLUIDS VISCOSIFIED BY BASIC N-HETEROCYCLIC POLYMERS

CROSS REFERENCE TO RELATED APPLICATION

Copending Application Ser. No. 413,571, filed Aug. 31, 1982, in the name of Israel J. Heilweil relates to brine fluids, particularly drilling fluids, which have high salt concentration and which are viscosified with polyvinylpyrrolidone.

The entire disclosure of this above-mentioned United States patent application is expressly incorporated herein by reference.

BACKGROUND OF THE INVENTION

The present invention relates to brine fluids, particularly drilling fluids, which have high salt concentration, are acidic and which are viscosified with basic N-heterocyclic polymers, such as, e.g., polyvinylpyridine.

During the drilling of an oil well, a usually aqueous fluid is injected into the well through the drill pipe and recirculated to the surface in the annular area between the well-bore wall and the drill string. The functions of the drilling fluid include: lubrication of the drill bit, transportation of cuttings to the surface, overbalancing formation pressure to prevent an influx of oil, gas or water into the well, maintenance of hole stability until casings can be set, suspension of solids when the fluid is not being circulated, and minimizing fluid loss into and possible associated damage/instability to the formation through which drilling is taking place.

Proper overbalancing of formation pressure is obtained by establishing fluid density at the desired level usually via the addition of barite (greater than or equal to 95% barium sulfate). Transportation of cuttings and their suspension when the fluid is not circulating is related to the fluid viscosity and thixotropy which depend on solids content and/or use of a polymer. Filter loss control is obtained also by the use of clays and/or added polymers.

Fluid properties are constantly monitored during the drilling operations and tailored to accommodate the nature of the formation stratum being encountered at the time. When drilling reaches the producing formation special concern is exercised. Preferentially low solids content fluids are used to minimize possible productivity loss by solids plugging. Proper fluids density for overbalancing formation pressure may be obtained by using high salt concentration aqueous brines while viscosity and filter loss control may be obtained by polymer addition. Substantial future oil well drilling will be at depths between 15 and 30 thousand feet where temperatures encountered can be 350° F. Temperatures such as these, coupled with the desire for low solids content and preferably minimum added solids, require brine tolerant and high temperature stable polymers for viscosity and filtration control. Conventionally employed polymers such as starch, carboxymethyl cellulose, and modified polyacrylates are not stable at such high temperatures and some have severe brine tolerance limitations.

Current high density, clear brine systems utilize hydroxyethyl cellulose polymers and related materials as viscosifiers, but these are normally unstable at about 150° C., and tend to crosslink and gel with time and temperature which may cause various drilling operational problems.

SUMMARY

According to one aspect of the invention, there is provided an aqueous brine fluid having a pH of less than about 5, said fluid comprising:

(i) a viscosity increasing amount of one or more basic N-heterocyclic polymers, said polymers having at least 50 mole percent of repeating units of the formula:

wherein $R_1$ is $C_2$–$C_6$ alkyl and where the moiety

represents a 5–7 membered heterocyclic ring system bound to $R_1$ through a carbon atom as represented by C in said moiety (II) and having at least one basic nitrogen atom as represented by N in said moiety (II); and (ii) at least about 30 percent by weight or even at least about 50 percent by weight of compatible salt.

According to another aspect of the invention, there is provided a brine fluid which is a drilling fluid having the above-mentioned components of basic N-heterocyclic polymer (i) and salt (ii).

According to another aspect of the invention, there is provided a method for transporting cuttings away from a drill bit to the surface of a bore hole, said method comprising entraining and suspending said cuttings in a drilling fluid having a pH of less than about 5 which flows from said drill bit up said bore hole to said surface, wherein said drilling fluid comprises:

(i) water;
(ii) at least 30% by weight of a density increasing salt in an amount sufficient to increase the density of said fluid in order to overbalance the formation pressure; and
(iii) a viscosity increasing amount of one or more basic N-heterocyclic polymers, said polymers having at least 50 mole percent of repeating units of the formula

where $R_1$ is $C_2$–$C_6$ alkyl and where the moiety

represents a 5–7 membered heterocyclic ring system bound to $R_1$ through a carbon atom as represented by C in said moiety (II) and having at least one basic nitrogen atom as represented by N in said moiety (II).

The above said fluid comprising components numbers (i), (ii) and (iii) can be used as a drilling fluid which is a completion fluid for use in drilling a bore hole with a drill bit, wherein the drill bit is in the vicinity of an oil or gas producing formation and can also be used in drilling a bore hole with a drill bit, wherein the drill bit is not in the vicinity of an oil or gas producing formation.

DETAILED DESCRIPTION

One or more basic N-heterocyclic polymers are added to acidic aqueous high brine content solutions (e.g., 30–60% wt. salt) providing a liquid of substantially enhanced viscosity which is particularly suitable for use as an oil well drilling fluid. The use of such polymers results in improved resistance to viscosity loss at elevated temperatures (e.g., more than about 300° F.) compared to conventional viscosity building water/brine soluble polymers and thus is useful in the drilling of deep wells. They may also provide some filtration control properties, reducing fluid loss into, and possible damage to, the oil bearing formation.

A preferred basic N-heterocyclic polymer is a homopolymer or copolymer having repeating units of the formula (I) as defined hereinabove. Copolymers with various unsaturated, addition polymerizable monomers are also possible, provided that the repeating polymeric units of the copolymers are predominantly of formula (I). Such homopolymers and copolymers preferably have a molecular weight of at least 10,000, most especially, at least 40,000.

The basic N-heterocyclic homopolymers and copolymers include those of block, graft and radial configuration, derived from pyridines, pyrimidines, triazines, and other basic heterocyclics optionally containing S, O, and P, e.g., in the heterocyclic ring systems. Preferred basic N-heterocyclic polymers are poly-4-vinyl pyridine and poly-2-vinyl pyridine.

The salt employed in the brine fluids may be capable of providing a rather high density to the brine fluid. For example, such a fluid particularly adapted for a deep well drilling fluid may have a density of, e.g., from about 14 to about 20 lbs/gal. The salt of such fluids, e.g., $ZnBr_2/CaBr$ are generally sufficiently acidic that the pH of the fluid is less than about 5, e.g., from about 2 to about 5. Optionally, however, a sufficient amount of an acid such as HCl or HBr may be added to the fluid to maintain a sufficiently low pH to maintain salt and polymer in solution.

Poly-4-vinyl pyridines, and poly-2-vinyl pyridines are soluble in low pH $ZnBr_2/CaBr_2$ brines (19 lbs/gal), and their viscosity is retained without gelation even after heating to temperatures as high as 200° C. for periods as long as 16 hours. An example of the viscosifying effect is noted by the fact that while the viscosity of the brine at 25° C. is 20 cp, that of 1% solution poly-2-vinyl pyridine (MW approximately 100,000) is about 100 cp at a shear rate of approximately 10 sec$^{-1}$.

Figure 1:
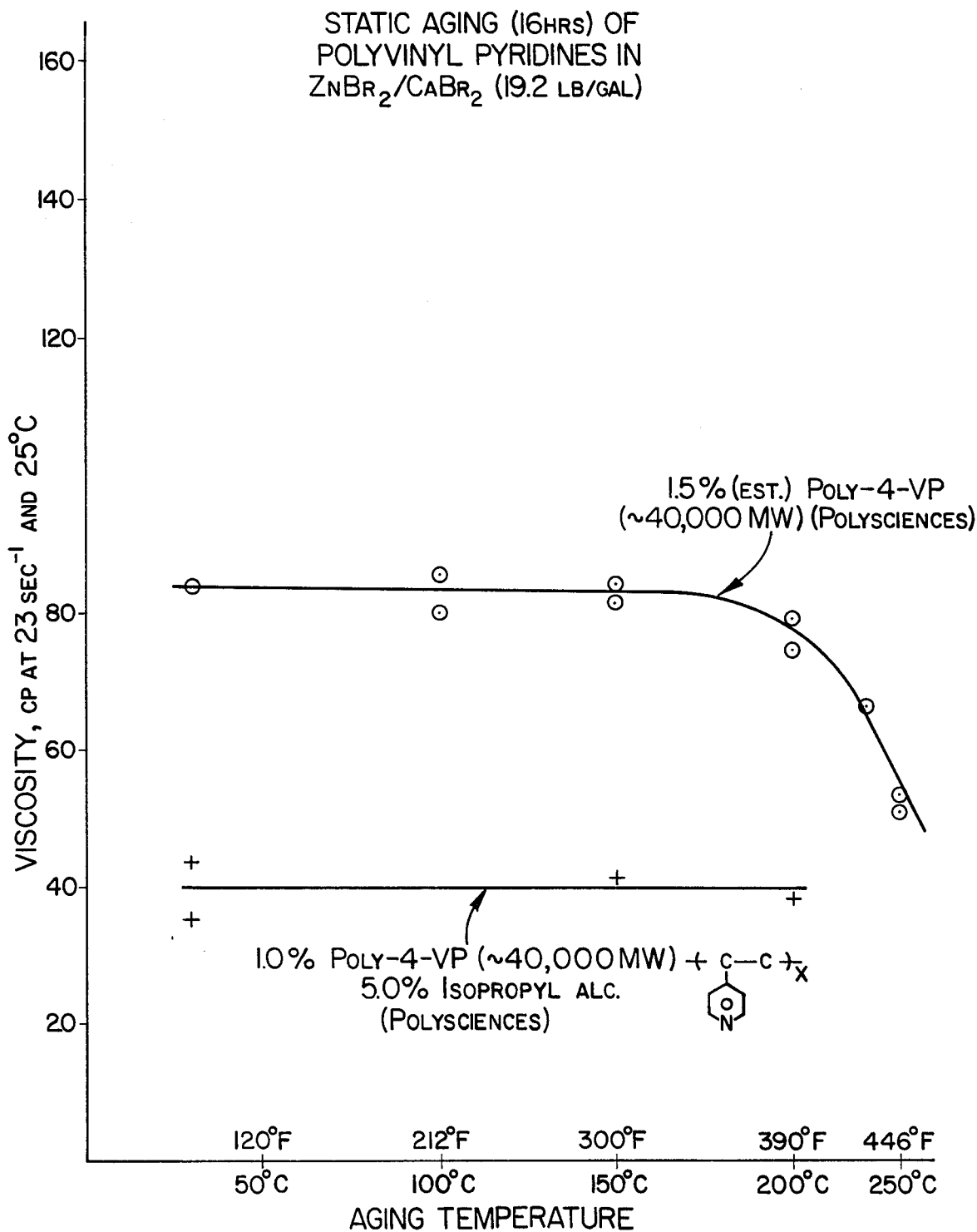
FIG. 1 is a graph showing the viscosifying effect of poly-4-vinyl pyridine in $ZnBr_2/CaBr_2$ brines having densities of 19.2 lbs/gal in static aging tests at elevated temperatures for 16 hours.
Figure 2:
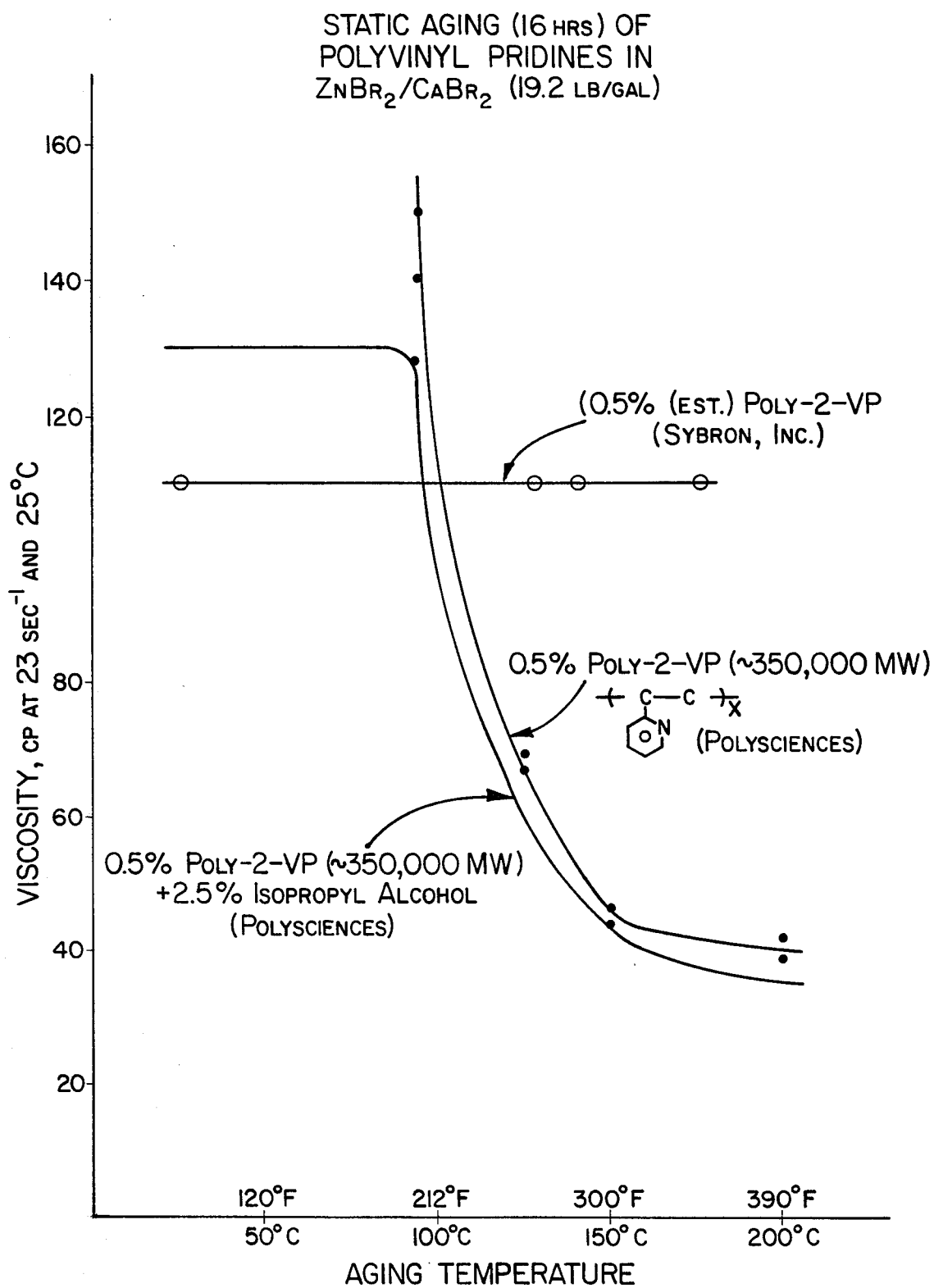
FIG. 2 is a graph showing the viscosifying effect of poly-2-vinyl pyridine in $ZnBr_2/CaBr_2$ brines having densities of 19.2 lbs/gal in static aging tests at elevated temperatures for 16 hours.

The viscosifying effects of polyvinyl pyridines in $ZnBr_2/CaBr_2$ brines having densities 19.2 lbs/gal in static aging tests at elevated temperatures for 16 hours are given in FIGS. 1 and 2.

High density, aqueous brine completion, workover, and packer fluids have become recognized in the last few years for their effectiveness in minimizing formation damage and providing wellbore stability, as well as in establishing and maintaining high productivity of oil and gas wells, G. Poole, Oil and Gas. J., July 13, 1981, p. 151; D. Acosta, Ibid., Mar. 2, 1981, p. 83; R. J. Spies et al., SPE 9425, September 1980.

Specifically, high density brine fluids are solutions containing 10 to 60 weight percent of salts such as NaCl, $CaCl_2$, $CaBr_2$, $ZnBr_2$ and their mixtures, having densities up to approximately 2.4 g/cc (approximately 20 lbs/gal). Their high salt content prevents swelling and dispersion of formation clays and shales by favorable ion exchange and osmotic pressure reduction. Their high densities provide sufficient hydrostatic head to balance formation pressures and thus prevent the influx of undesirable fluids into wells during drilling. Since they are free of dispersed solids, the high density fluids are particularly noted for their prevention of formation plugging, high hydrocarbon recovery, and efficient bottomhole cleaning.

With current accelerated efforts to discover new oil and gas deposits by deep drilling (say, below 10,000 feet) (Note B. Tippee, Oil and Gas J., Aug. 10, 1981, p. 33), it has become recognized that future developments in drilling fluid technology must make use of viscosifiers, fluid loss control agents, and other additives that are capable of satisfactory performance at high temperatures (greater than 135° C., greater than 275° F.) and high pressures (greater than 5,000 psi). The use of basic N-heterocyclic polymers may lead to particularly useful high temperature stable, high density brine drilling fluids.

Information and directions are provided herein for other clear brines, polymers, and additives for high density, multifunctional fluids for deep well drilling. Here are some examples: increasing M.W. to reduce the polymer content and hence cost; utilizing monomers in "engineered" non-ionic and ionic polymers and copolymers, including block, star, graft, and ionene varieties; extending the polymer/brine system to include highly temperature stable amides, e.g., nylons, Kevlar, Nomex; selecting other high density brines and brine mixtures, e.g., brines containing LiCl, $CaI_2$, $Ca(SCN)_2$, etc., with and without admixture of suitable solubilizing surfactants; selecting polar and hydrocarbon-derived solvents instead of water [note applicant's copending U.S. application Ser. No. 413,575, filed Aug. 31, 1982]; in situ polymerization of monomers in wells and in gas and oil formations containing highly concentrated brines, etc. Low molecular weight surfactants, chemically and structurally similar to the basic N-heterocyclic polymers discussed herein, may be used as co-additives in dense, clear brine multifunctional drilling fluid formulations. These co-additives would reduce corrosion and friction, render well surfaces hydrophobic so as to further decrease filter losses, solubilize and/or complex $H_2S$ and other gases thus reducing the dangers of explosions and blowouts, increase drilling rates to make deep-well drilling economically more viable, etc.

The viscosity increasing amount of polymer used in accordance with aspects of the present invention is that amount which is sufficient to achieve the desired viscosifying functions. In drilling fluids these functions involve transportation of cuttings to the surface and suspension of solids when the drilling fluid is not being circulated. The use of a viscosity increasing amount of polymer may result in an increase in viscosity at room temperature of a factor of, e.g., at least 4. In other terms, the amount of basic N-heterocyclic polymer employed may be, e.g., about 0.5–10% by weight of the fluid.

The salinity of the aqueous brine drilling fluid in accordance with aspects of the invention may be from at least 30% by weight up to the salt saturation point of the fluid, which is generally about 60–65% by weight. The brine fluids of the present invention may have a density of, e.g., from about 12 to about 20 pounds per gallon.

Although the viscosifying effect of basic N-heterocyclic polymers in accordance with aspects of the present invention is preferably useful in completion fluids for drilling in the vicinity of oil or gas producing formations, this effect may also be used when drilling in areas other than in the vicinity of oil or gas formations. Thus, basic N-heterocyclic polymer viscosified drilling fluids may contain constituents other than water, brine and surfactants, such as filter loss control solids in an amount sufficient to prevent loss of fluid to the formation.

Basic N-heterocyclic polymer viscosified aqueous brine drilling fluids, particularly completion fluids, are felt to be useful when drilling in formations having a temperature of at least 300° F. (e.g., 300°–450° F.). Such temperatures may occur at drilling depths of at least 15,000 feet (e.g., 15,000–30,000 feet).

The drilling fluids of the present invention preferably do not contain other polymeric thickeners such as starch, carboxymethyl cellulose, and modified polyacrylates or mixing agents such as crude oil and diesel oil.

Although basic N-heterocyclic polymer/brine fluids have been described herein primarily with respect to their use as drilling fluids, it will be understood that these fluids may also be quite useful in other fields. More particularly, these fluids should be applicable to a wide range of industrial applications, such as for example in processing minerals from salty solutions, in the production of specialty coatings, polymers, fibers, and membranes, in the formulation of "synthetic" water-based pneumatic fluids and novel lubricants, and last, but not least, in light energy conversion based on heat transport between concentrated and less concentrated brine layers in ponds.

The present invention may comprise, consist essentially of or consist of the materials or method steps described herein.

What is claimed is:

1. An aqueous brine fluid having a pH of less than about 5, said fluid comprising:
   (i) water;
   (ii) a viscosity increasing amount of a N-heterocyclic polymer selected from the group consisting of poly-4-vinyl pyridine, poly-2-vinyl pyridine and mixtures thereof; and
   (iii) at least about 30 percent by weight of compatible salt dissolved in said fluid.

2. A fluid according to claim 1, wherein said viscosity increasing amount is sufficient to increase the viscosity of said brine fluid by a factor of at least 4 at room temperature.

3. A fluid according to claim 1, wherein said salt is selected from the group consisting of $ZnBr_2$, $CaBr_2$, $NaBr$, $KI$, $NiCl_2$, $LiCl_2$, $CaI_2$, $Ca(SCN)_2$ and mixtures thereof.

4. A fluid according to claim 1, wherein said salt is a mixture of $ZnBr_2$ and $CaBr_2$.

5. A fluid according to claim 4, wherein said fluid has a density of from about 14 to about 20 lbs/gal.

6. A fluid according to claim 1 which is a drilling fluid.

7. A drilling fluid which is a completion fluid for use in drilling a bore hole with a drill bit, wherein said drill bit is in the vicinity of an oil or gas producing formation, said completion fluid having a pH of less than about 5 and consisting essentially of
   (i) water;
   (ii) a density increasing salt dissolved in said fluid in an amount sufficient to increase the density of said fluid in order to overbalance the formation pressure, said density increasing salt being present in an amount of at least about 30% by weight of said fluid; and
   (iii) a viscosity increasing amount of a basic N-heterocylic polymer selected from the group consisting of poly-4-vinyl pyridine, poly-2-vinyl pyridine and mixtures thereof.

8. A drilling completion fluid according to claim 7, wherein said viscosity increasing amount is sufficient to increase the viscosity of said fluid by a factor of at least 4 at room temperature.

9. A drilling completion fluid according to claim 7 having a density of from about 14 to about 20 pounds per gallon.

10. A drilling completion fluid according to claim 9, wherein said density increasing salt is selected from the group consisting of $ZnBr_2$, $CaBr_2$, $NaBr$, $KI$, $NiCl_2$, $LiCl_2$, $CaI_2$, $Ca(SCN)_2$ and mixtures thereof.

11. A drilling completion fluid according to claim 7 which does not contain oil mixing agents.

12. A drilling completion fluid according to claim 10, wherein said density increasing salt is a mixture of $ZnBr_2$ and $CaBr_2$.

13. A drilling fluid for use in drilling a bore hole with a drill bit, wherein said drill bit is not in the vicinity of an oil or gas producing formation, said drilling fluid having a pH of less than about 5 and comprising:
   (i) water;
   (ii) a density increasing salt dissolved in said fluid in an amount sufficient to increase the density of said fluid in order to overbalance the formation pressure, said density increasing salt being present in an amount of at least about 30% by weight of said fluid;
   (iii) filter loss control solids selected from the group consisting of clays and polymers in an amount sufficient to prevent loss of fluid to said formation; and
   (iv) a viscosity increasing amount of a basic N-heterocyclic polymer selected from the group consisting of poly-4-vinyl pyridine, poly-2-vinyl pyridine and mixtures thereof.

14. A method for transporting cuttings away from a drill bit to the surface of a bore hole, said method comprising entraining and suspending said cuttings in a drilling fluid which flows from said drill bit up said bore hole to said surface, wherein said drilling fluid has a pH of less than about 5 and comprises:
(i) water;
(ii) a density increasing salt dissolved in said fluid in an amount sufficient to increase the density of said fluid in order to overbalance the formation pressure, said density increasing salt being present in an amount of at least about 30% by weight of said fluid; and
(iii) a viscosity increasing amount of a basic N-heterocyclic polymer selected from the group consisting of poly-4-vinyl pyridine, poly-2-vinyl pyridine and mixtures thereof.

15. A method according to claim 14, wherein said viscosity increasing amount is sufficient to increase the viscosity of said fluid by a factor of at least 4 at room temperature.

16. A method according to claim 14, wherein said drilling fluid has a density of from about 14 to about 20 pounds per gallon.

17. A method according to claim 14, wherein said density increasing salt is selected from the group consisting of $ZnBr_2$, $CaBr_2$, $NaBr$, $KI$, $NiCl_2$, $LiCl_2$, $CaI_2$, $Ca(SCN)_2$ and mixtures thereof.

18. A method according to claim 14, wherein said fluid does not contain oil mixing agents.

19. A method according to claim 16, wherein said density increasing salt is a mixture of $ZnBr_2$ and $CaBr_2$.

* * * * *